Jan. 28, 1958 R. R. CARLTON 2,821,097
APPARATUS FOR SHARPENING SAW CHAINS
Filed May 31, 1955 2 Sheets-Sheet 1

INVENTOR.
RAYMOND ROBERT CARLTON
BY
Buckhorn and Cheatham
ATTORNEY

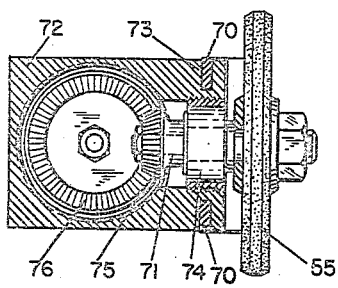
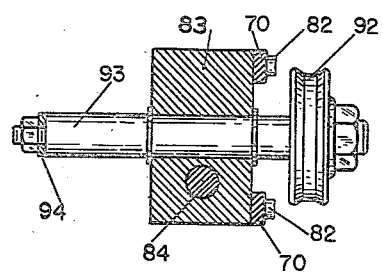
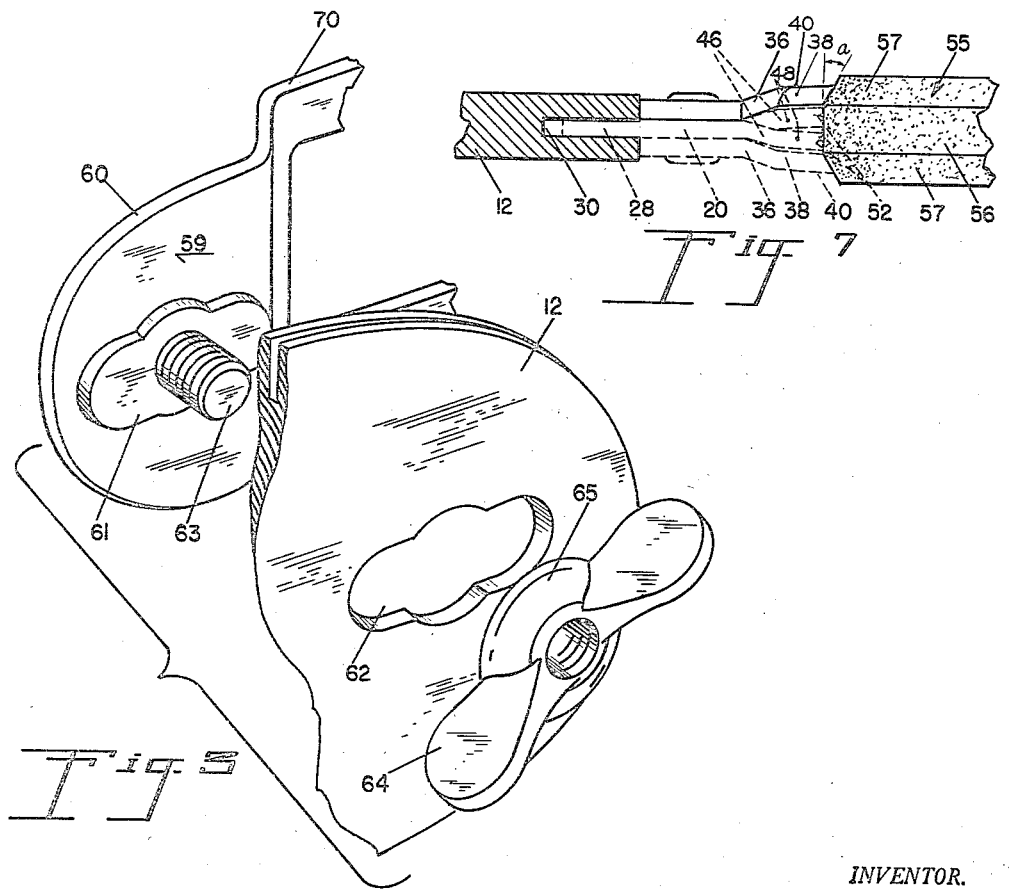

United States Patent Office 2,821,097
Patented Jan. 28, 1958

2,821,097

APPARATUS FOR SHARPENING SAW CHAINS

Raymond R. Carlton, Portland, Oreg., assignor to Oregon Saw Chain Corp., Portland, Oreg., a corporation of Oregon Application May 31, 1955, Serial No. 512,154

8 Claims. (Cl. 76—37)

The present invention relates to apparatus for sharpening saw chains, and more particularly to apparatus for sharpening scratcher type saw chains.

A "scratcher" chain is characterized by opposite cutting teeth which slit or cut their way through the wood on the opposite sides of the kerf, and raker teeth spaced to engage the kerf between the cuts of the cutter teeth and to rake or scratch out the material therebetween. While such chains have certain advantages, their utility has heretofore been limited because it was necessary to sharpen such chain by hand filing. This involves considerable time because of the numerous teeth in the chain and the care that must be exercised to maintain the proper height relation between the teeth and the proper disposition between the various faces of the teeth so that the chain will operate at its maximum efficiency. In my copending patent application Serial No. 487,346, filed February 10, 1955, I have described a new and improved method of sharpening scratcher type chains which permits the use of power driven apparatus for sharpening the same.

It is a principal object of the present invention to provide suitable power driven apparatus for sharpening scratcher type saw chains.

More particularly, it is an object of the invention to provide apparatus for sharpening a scratcher type saw chain quickly and easily with a minimum of manual effort.

Another object of the invention is to provide a new and improved apparatus for sharpening scratcher type saw chains which enables unskilled personnel to sharpen such chains.

A still further object of the invention is to provide apparatus for sharpening a saw chain of the scratcher type which automatically assures that each tooth of the chain is of proper height with relation to the other teeth of the chain.

Another object of the invention is to provide power driven apparatus that may be used in combination with a chain saw for sharpening a scratcher type saw chain carried by the saw.

A further object is to provide an apparatus of the type described that may be removably mounted on the saw bar of a chain saw for sharpening a scratcher type saw chain carried by the bar.

A further object is to provide power driven apparatus adapted for attachment to a chain saw saw-bar for sharpening a scratcher type chain, which apparatus is adapted to be driven by the motor of the chain saw.

Other objects and advantages of the present invention will become more apparent hereinafter.

In accordance with the illustrated embodiment of the invention, there is provided apparatus for mounting a grinding wheel adjacent the periphery of the rounded end of a saw-bar carrying a scratcher type saw chain to be sharpened. Means are provided for driving the grinding wheel, and further means are provided for moving the grinding wheel into engagement with the ends of the saw chain teeth as the saw chain is driven about the bar to effect grinding of the top surface of each of the teeth to sharpen the same.

For a more detailed description of the invention, reference is made to the accompanying drawings wherein:

Fig. 3 is an exploded fragmentary view showing details of the structure for mounting the sharpening apparatus of the invention on a chain saw saw-bar;

Fig. 5 is a sectional view taken along line 5—5 of Fig. 1;

Fig. 6 is a sectional view taken along line 6—6 of Fig. 1; and

Fig. 7 is a sectional view taken along line 7—7 of Fig. 4 and showing the relative position of the various teeth of the chain as they approach the sharpening apparatus.

Figure 1:
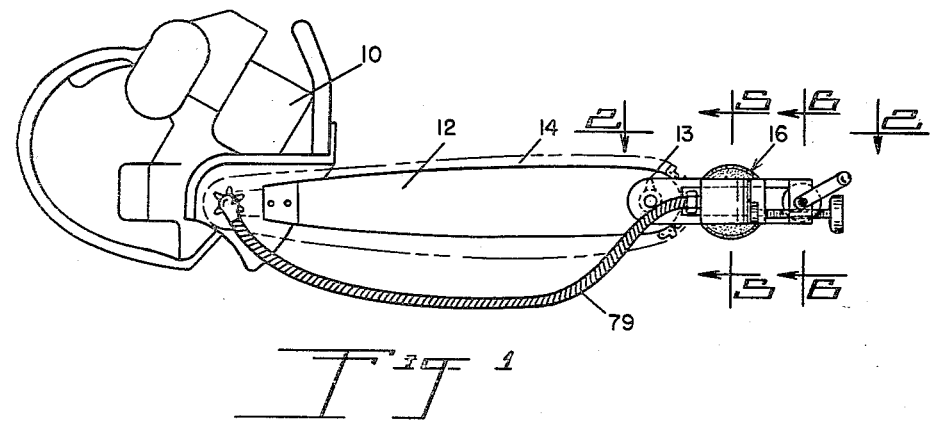
Fig. 1 is a side elevation of a chain saw with the sharpening apparatus of the invention secured thereto.

Fig. 1 is a view of a chain saw equipped with apparatus of the present invention for effecting sharpening of a scratcher chain such as shown in my copending application Serial No. 487,346, filed February 10, 1955, and in accordance with the method set forth in that same application. The motor of the saw is indicated at 10, to the frame of which is secured a guide member such as parallel sided saw bar 12 having an arcuate nose 13 and having a saw chain 14 trained thereabout. The sharpening device or apparatus of the invention is attached to the saw bar nose 13 and is indicated generally at 16 in Fig. 1.

Figure 4:
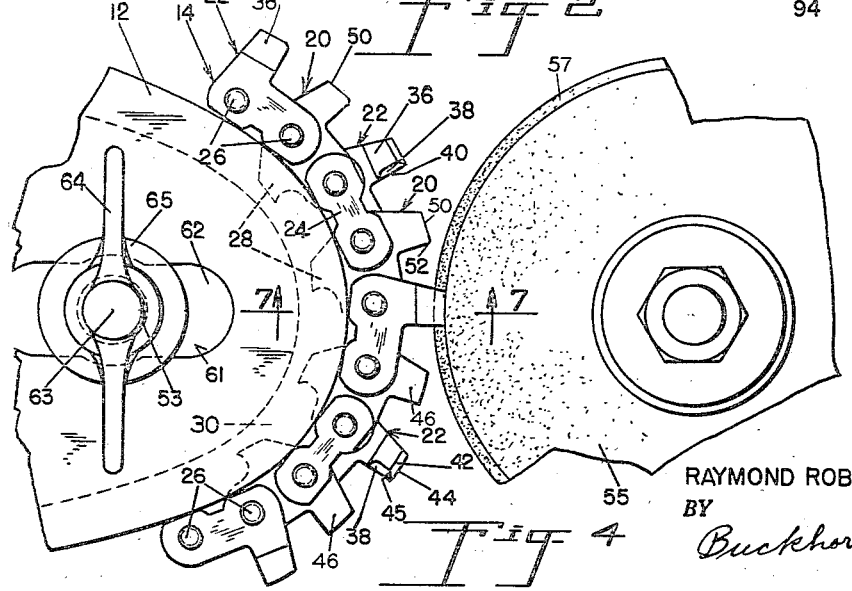
Fig. 4 is an enlarged, fragmentary view showing certain details of the invention.

Referring now more particularly to Figs. 4 and 7, the saw chain 14 is illustrated as comprising a plurality of longitudinally spaced apart center links 20 and opposite side cutter links 22 and side straps 24 connected by means of conventional pivot pins 26 into a continuous chain. Each of the center links 20 is provided with a root portion 28 adapted to ride in a slot or groove 30 formed in the periphery of the saw bar 12 as shown in Fig. 7, the root portions 28 also being adapted for engagement with the teeth of the driving sprocket of the chain saw motor, as is well known.

The side cutter links 22, which are of alternate right and left configuration but otherwise identical, each comprises an elongate base portion adapted to ride on the periphery of the saw bar 12 and having openings adjacent the leading and trailing ends thereof for receiving the pivot pins 26. Extending outwardly from the base portion of each link 22 relative to the saw bar 12 is a tooth portion 36 which is offset laterally from the base portion away from the longitudinal median plane of the chain, as shown most clearly in Fig. 7, and positioned wholly rearwardly of the center of the link as is evident from Fig. 4. The front face 38 of each of the tooth portions 36 is substantially planar and beveled with respect to the outer side surface of the tooth so as to define a leading edge 40 on the outer side of the tooth. The offset of the tooth portion 36 is such that the leading edges 40 are positioned laterally outwardly of the plane of the corresponding side of the side bar, and all other portions of chain, as may be seen in Fig. 7.

The side cutter tooth portions 36 are each formed with a top or end face 42 that is beveled downwardly and inwardly of the tooth from the outer edge 44 thereof which face, after being sharpened by the apparatus of the invention, recedes downwardly in a curve from the leading or cutting edge 45 of the tooth as most clearly shown in Fig. 4.

The center links 20 are each formed with a raker tooth portion 46 extending outwardly from the saw bar 12, The raker tooth portions 46 are bent alternately to the right or left of the longitudinal median plane of the chain but to a lesser extent than the side cutter tooth portions 36 whereby the cutter tooth portions 36 are disposed wholly laterally outwardly of the raker tooth portions 46.

The raker tooth portions 46 are each provided with a front face 48 spaced wholly rearwardly of the midpoint of the link and with a top face 50 which, after sharpening with the apparatus of the invention, is rearwardly and downwardly curved from the front or cutting edge 52 thereof. As indicated in Fig. 7, the cutting edges 52 preferably are disposed wholly below the cutting edges 45 of the side cutter tooth portions 36. Such a chain is more fully described and claimed in my copending application, supra. The free end or nose of the saw bar 12 is illustrated as rounded or arcuate about an axis indicated at 53 in Fig. 4.

In operation, a scratcher type saw chain, such as the chain 14, cuts a kerf through the wood by reason of the side cutter teeth 36 forming spaced apart slices through the wood, and the raker teeth 46 following to scratch out the material between the slices. The teeth of the scatcher chain become worn and dull by reason of the wear and consequent regression and rounding of the cutting edges 45, 52 of the teeth. Heretofore, scratcher saw chain teeth have been sharpened by filing back the leading faces 38, 48 of the teeth so as to form new sharp cutting edges thereon. When done by hand this is a laborious task because of the many teeth of a chain and their close proximity to one another which hampers the manipulation of the file. Moreover, the various angles of disposition of the faces of the teeth require careful handling of the file and it requires long practice to become proficient in filing. To maintain a chain at its peak efficiency, the cutting edges 52 of the raker teeth 46 should be maintained below the cutting edges 45 of the cutter teeth 36 as illustrated in Fig. 7. However, ordinarily the regression on the cutting teeth 36 of a chain will be greater than the regression on the raker teeth 46 so that it is not necessary to file back the raker teeth as far as the cutting teeth to sharpen the same. It has been the inclination of persons sharpening a chain to file back the faces 48 of the raker teeth only so far as is necessary to form new sharp cutting edges 52 thereon and which generally is not sufficient to lower the edges 52 by the same distances that the cutting edges 45 of the cutter teeth are lowered by reason of the sharpening thereof. Thus, the desired difference in tooth height is lost and the efficiency of the chain impaired.

In accordance with the method of my invention, as set forth in my copending application referred to above, scratcher chain teeth are resharpened by moving the chain longitudinally in a convexly curved arcuate path and causing a grinding wheel to engage the top or end faces of the teeth as they move through the arcuate path. This causes material to be removed from the end faces of the teeth to form a new, sharp cutting edge on each. In accordance with the illustrated embodiment of the present invention, the saw chain 14 is driven about the saw bar 12, and means are provided for mounting a grinding wheel 55 adjacent the arcuate nose 13 of the bar so as to engage the top of the teeth as they pass about the nose to effect resharpening thereof.

With particular reference to Fig. 7, the grinding wheel 55 is formed with a flat, axially parallel, central peripheral portion 56 adapted to engage the raker tooth top faces 50 and with opposite, beveled peripheral edge portions 57 adapted to engage the top faces 42 of the opposite side cutter teeth 36. The edge portions 57 preferably are sloped or beveled as shown in Fig. 7 so as to form the desired angle $a$ of inward bevel on the top cutter faces 42, which angle is preferably about 20 degrees.

Referring now more particularly to Figs. 2 to 5, inclusive, the sharpening device 16 includes a frame having a mounting portion 60 having a flat surface 59 adapted to abut against one side surface of the saw bar 12 and formed with a boss 61 shaped to fit within a cooperative opening 62 formed in the saw bar adjacent the nose 13 as shown most clearly in Fig. 3. Projecting from the boss 61 is a stud 63 adapted for engagement by a clamping nut 64 comprising a flat collar portion 65 adapted to engage the side of the saw bar opposite the frame so as to clamp the frame to the saw bar.

Figure 2:
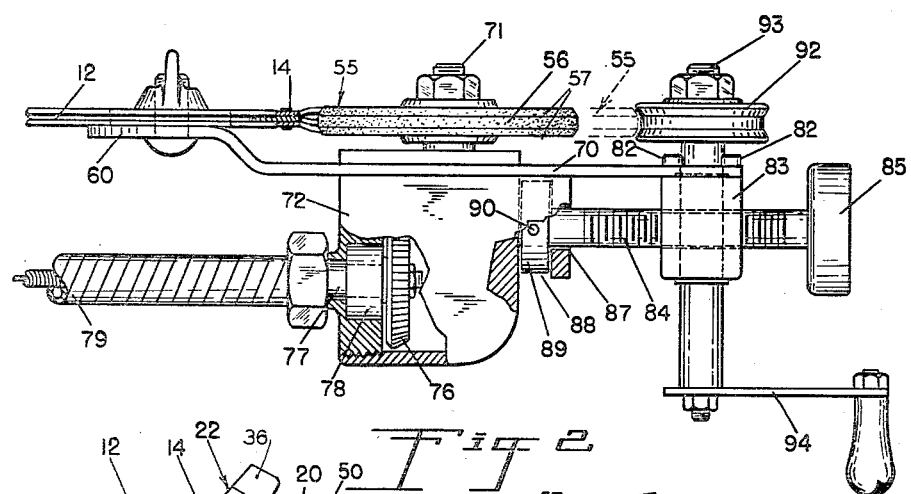
Fig. 2 is an enlarged view of the sharpening apparatus, partly in section, looking in the direction of the arrows 2—2 of Fig. 1.

Offset from the frame end portion 60 is a grinding wheel supporting portion for supporting the grinding wheel 55 in alignment with the saw bar 12 and consisting of a pair of spaced apart, longitudinally parallel bars 70 which extend forwardly from the saw bar nose. The grinding wheel 55 is secured to a shaft 71 which extends outwardly from a transmission housing 72 consisting of a hollow block having slots 73 in the opposite sides thereof in which the bars 70 are slidably received, as shown in Fig. 5. The grinding wheel is mounted on the frame so that its median plane will be substantially coincident with the median pane of the saw bar 12 and thus symmetrical with the saw chain. The shaft 71 is journaled in a bearing 74 and has fixed on the end thereof within the housing a beveled gear 75 which meshes with a larger beveled gear 76, the latter gear being fixed to a stub shaft 77 which extends outwardly of the housing 72 and is journaled in a bearing 78, as shown in Fig. 2. The stub shaft 77 is adapted to be connected to any suitable source of power for driving the grinding wheel 55. In the present instance the shaft 77 is shown as being connected to the motor 10 of the saw by means of a flexible drive cable 79 which is preferably elongate so that the apparatus may be used with saw bars of various length.

Means are provided for moving the grinding wheel 55 toward and away from the saw chain 14. Referring now to Figs. 2 and 6, secured to the free ends of the bars 70 by suitable means such as screws 82 is a block 83 through which is threaded a screw member 84 extending in axially parallel relation with the bars 70. The screw member is provided with a knob 85 for effecting rotation of the screw member whereby it can be advanced or retracted longitudinally of the bar 70. The screw member 84 is secured to the transmission housing 72 so that by retracting or advancing the screw, the grinding wheel 55 can be moved toward or away from the saw chain. In the embodiment illustrated, the screw member 84 extends through an opening 87 into a slot 88 formed in the housing block 72 and in which slot a collar 89 is mounted, the collar being secured to the screw member 84 by means of a setscrew 90 or other suitable means whereby axial movement of the screw member 84 effects corresponding movement of the transmission housing 72 and the grinding wheel 55.

Means are provided for dressing the periphery of the grinding wheel, such means in the illustrated embodiment comprising a crushing type dressing wheel 92 mounted in axially parallel relation with the grinding wheel 55. The contour of the dressing wheel face is complementary to that desired on the grinding wheel 55 and it is important that the dressing wheel be mounted on the frame so that it will be symmetrical with respect to the median plane of the saw bar 12 to form a surface on the grinding wheel 55 that is symmetrical with such plane.

To sharpen a saw chain, the device of the invention is secured to the saw bar as shown, and the drive cable 79 attached to the power take-off of the saw chain motor 10 or other suitable power source as desired. The motor 10 is then started so as to drive the saw chain 14 about the saw bar 12 and to drive the grinding wheel 55. Thereafter the knob 85 is rotated to move the grinding wheel 55 into engagement with the ends of the saw chain tooth portions 36, 46. As the tooth portions 36, 46 engage the periphery of the grinding wheel 55, the end faces thereof will be ground away to form new surfaces thereon which are curved in an arc concentric with the axis 53 of saw bar nose 13. The sharpening operation is continued until the end faces 42, 50 of the teeth are lowered sufficiently to form a sharp line of intersection with the corresponding leading faces of the teeth whereby to provide a new sharp cutting edge 45 or 52 on each of the teeth. With the apparatus of the invention, a saw chain can be sharpened in a very few minutes which is a fraction of the time that would be required to sharpen the same chain by hand filing as has been done heretofore. Moreover, each of the cutting tooth portions 36 will, after sharpening, be of exactly the same height, and the raker tooth portions 46 will also be lowered by the same amount as the cutting tooth portions 36 whereby automatically to joint the teeth of the chain.

To dress the grinding wheel 55 it is simply retracted into engagement with the dressing wheel 92 as indicated in dotted lines in Fig. 2 and the dressing wheel rotated by means of the handle 94 so as to crush the periphery of the grinding wheel to the desired configuration in the conventional manner.

It is to be understood, of course, that the saw chain 14 need not necessarily be mounted on a saw bar to sharpen the same in accordance with the invention. It may be desirable in a shop, for example, to provide a permanent type of track or guide means which presents a curved path around which the saw chain to be sharpened may be passed and to provide a suitable mounting arrangement for a grinding wheel adjacent the track forming means to engage the ends of the saw teeth as they pass therearound in a manner similar to that described above.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. Apparatus for sharpening the teeth of a scratcher type saw chain mounted on a saw bar with a rounded nose by grinding the end faces of such teeth as they pass around said nose, said apparatus comprising an elongate frame having means at one end thereof for attaching said frame one end to said saw bar adjacent said nose with said frame extending forwardly of said nose, a grinding wheel mounted on the intermediate portion of said frame for engagement of the end faces of said saw chain teeth with the periphery of the grinding wheel, a crushing wheel for dressing the periphery of said grinding wheel to a predetermined contour symmetrical with respect to the median plane of said saw bar, means mounting said crushing wheel on the end of said frame opposite said one end, said grinding wheel being mounted for movement longitudinally of said frame, and means on said frame for moving said grinding wheel longitudinally so as to bring the grinding wheel selectively into engagement with the ends of said teeth and with said dressing means.

2. Apparatus for sharpening the teeth of a scratcher type saw chain mounted on a saw bar with a rounded nose by grinding the end faces of such teeth as they pass around said nose, said apparatus comprising an elongate frame having means at one end thereof for attaching the frame to said saw bar adjacent said nose with said frame extending forwardly of said nose, a grinding wheel mounted on the intermediate portion of said frame for engagement of the end faces of said saw chain teeth with the periphery of said grinding wheel, dressing means on the opposite end of said frame for dressing the periphery of said wheel to a predetermined contour symmetrical with respect to the median plane of said saw bar, said grinding wheel being mounted for movement longitudinally of said frame, and means on said frame for moving said grinding wheel longitudinally so as to bring the grinding wheel alternatively into engagement with the ends of said teeth and with said dressing means.

3. Apparatus for sharpening a scratcher type saw chain comprising a plurality of centrally disposed raker links and right and left cutter links disposed on opposite sides of said raker links, said apparatus comprising a guide member upon which said chain may be mounted for longitudinal movement, and including a convexly curved portion about which the said saw chain passes in said longitudinal movement, a circular grinding wheel formed with the central portion of the periphery thereof parallel to the axis of said wheel and with the opposite edge portions of the periphery beveled obliquely with respect to said axis, said central portion having a width substantially equal to the lateral distance between said right and left cutter teeth, mounting means rotatably supporting said wheel adjacent the curved portion of said guide member with the axis of said grinding wheel in axially parallel relation to the axis of said curved portion and with said central portion of said grinding wheel positioned to engage the ends of said raker links and said edge portions to engage the ends of said cutter links, means for driving said saw chain about said guide member, and means for driving said grinding wheel whereby the end surfaces of said links will be ground by said wheel to effect sharpening of the cutting edges of said links.

4. Apparatus for sharpening a scratcher type saw chain mounted on a saw bar having a rounded nose, said saw chain comprising a plurality of centrally disposed raker links and right and left cutter links disposed on opposite sides of said raker links and having forward cutting edges spaced beyond the outer extremity of the forward cutting edges of said raker links, said apparatus comprising an elongate frame having means at one end thereof for attaching the frame to said saw bar adjacent said nose with said frame extending forwardly of said nose, and a grinding wheel mounted on said frame so as to be positioned with its axis parallel to the axis of curvature of said nose, means for continuously moving said chain longitudinally of itself on said bar and means for rotating said grinding wheel, said grinding wheel having a central portion for engaging the ends of said raker links and opposite side portions of predetermined lesser diameter than said central portion for engaging the ends of said cutter links.

5. Apparatus for sharpening a scratcher type saw chain mounted on a saw bar having a rounded nose, said saw chain comprising a plurality of centrally disposed raker links and right and left cutter links disposed on opposite sides of said raker links and having forward cutting edges spaced beyond the outer extremity of the forward cutting edges of said raker links, said apparatus comprising an elongate frame having means at one end thereof for attaching the frame to said saw bar adjacent said nose with said frame extending forwardly of said nose, a grinding wheel mounted on said frame so as to be positioned with its axis parallel to the axis of curvature of said nose, means for continuously moving said chain longitudinally of itself on said bar means for rotating said grinding wheel, said grinding wheel having a central portion for engaging the ends of said raker links and opposite side portions of predetermined lesser diameter than said central portion for engaging the ends of said cutter links, and means on said frame for moving said grinding wheel toward and away from said saw chain.

6. Apparatus for sharpening a scratcher type saw chain mounted on a saw bar having a rounded nose, said saw chain comprising a plurality of centrally disposed raker links and oppositely disposed right and left cutter links of greater height than said raker links and having end faces sloping inwardly and downwardly toward the center line of the chain, said apparatus comprising an elongate frame having means at one end thereof for attaching the frame to said saw bar adjacent said nose with said frame extending forwardly of said nose, and a grinding wheel mounted on said frame so as to be positioned with its axis parallel to the axis of curvature of said nose, means for continuously moving said chain longitudinally of itself on said bar and means for rotating said grinding wheel, said grinding wheel having a central portion for engaging the ends of said raker links and opposite side portions sloping from said central portion for engaging the end faces of said cutter links.

7. Apparatus for sharpening and jointing a saw chain having scratcher type teeth including centrally disposed raker teeth and oppositely disposed right and left cutter teeth of greater height than said raker teeth, said apparatus comprising a guide member for supporting said chain for longitudinal movement and providing a convexly curved path for said chain, means for continuously moving said chain in said path, a grinding wheel, and means mounting said grinding wheel adjacent said guide member with the axis of the grinding wheel parallel to the axis of said chain path and with the periphery of the grinding wheel in abrading engagement with the ends of said teeth as they move in said curved path, the periphery of said wheel being formed with a central portion for engaging the ends of said raker teeth and opposite side portions for engaging the ends of said right and left cutter teeth, said central portion being of greater diameter than said side portions.

8. A saw chain sharpening and jointing attachment for use with a chain saw having a scratcher type saw chain including centrally disposed raker teeth and oppositely disposed right and left cutter teeth of greater height than said raker teeth mounted upon a planar guide member providing in part a convexly curved path for said chain, means for continuously moving said chain longitudinally of itself along said curved path, said attachment comprising a frame, a grinding wheel rotatably mounted on said frame, and means on said frame for attaching the frame to said guide member with said wheel adjacent said curved path with the axis of said grinding wheel extending at right angles to the plane of said guide member, the periphery of said wheel being formed with a central portion for engaging the ends of said raker teeth and opposite side portions for engaging the ends of said right and left cutter teeth, said central portion being of greater diameter than said side portions.

References Cited in the file of this patent

UNITED STATES PATENTS

| | | |
|---|---|---|
| 2,112,679 | Rickenmann et al. | Mar. 29, 1938 |
| 2,217,145 | Stihl | Oct. 8, 1940 |
| 2,533,648 | Warburg et al. | Dec. 12, 1950 |
| 2,589,165 | Toy et al. | Mar. 11, 1952 |
| 2,651,336 | Warren | Sept. 8, 1953 |
| 2,656,738 | Tomlin | Oct. 27, 1953 |
| 2,699,691 | Grupp | Jan. 18, 1955 |
| 2,716,908 | Lundberg | Sept. 6, 1955 |
| 2,720,062 | Fouquet | Oct. 11, 1955 |
| 2,729,987 | Bluemink | Jan. 10, 1956 |

FOREIGN PATENTS

| | | |
|---|---|---|
| 455,128 | Canada | Mar. 15, 1949 |
| 581,061 | Germany | Dec. 4, 1930 |
| 811,667 | Germany | Aug. 23, 1951 |